J. RAYNOR & C. FOSTER.
CHECK ROW PLANTER AND MARKER.
APPLICATION FILED SEPT. 9, 1908.
937,176.
Patented Oct. 19, 1909.
5 SHEETS—SHEET 3.
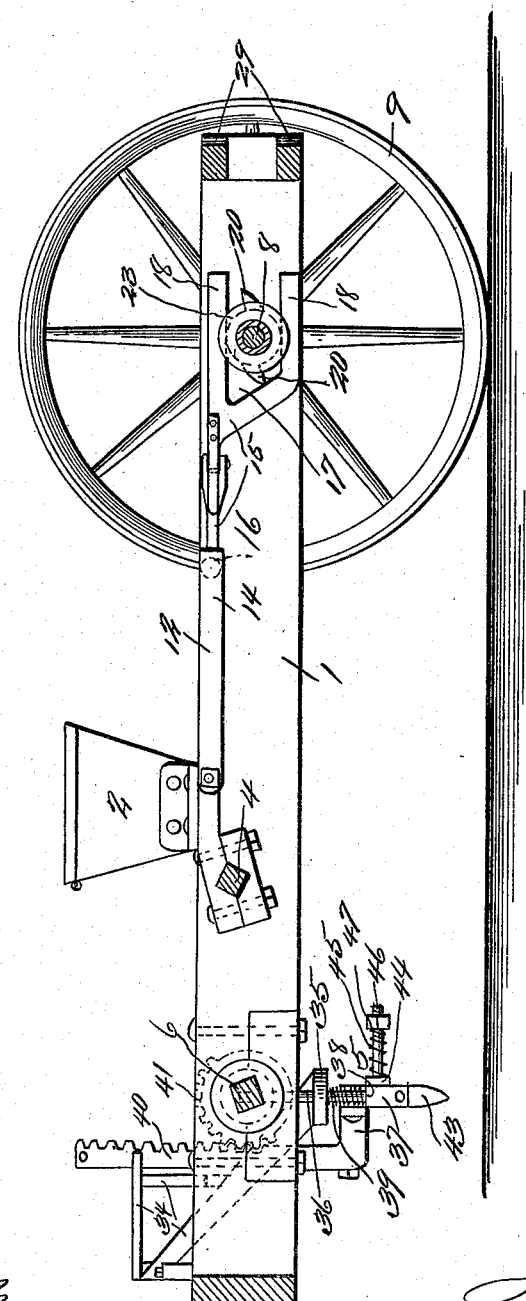

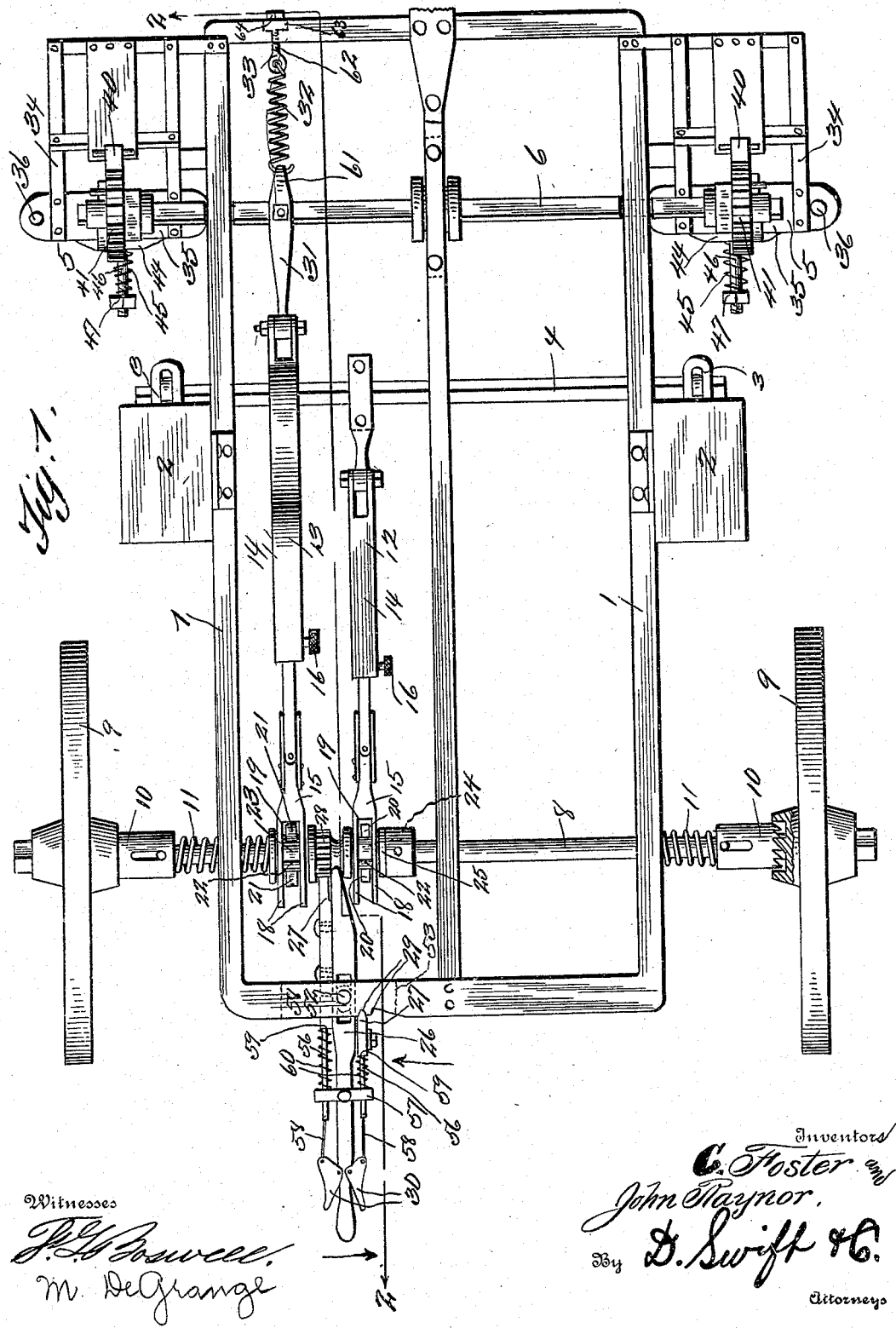

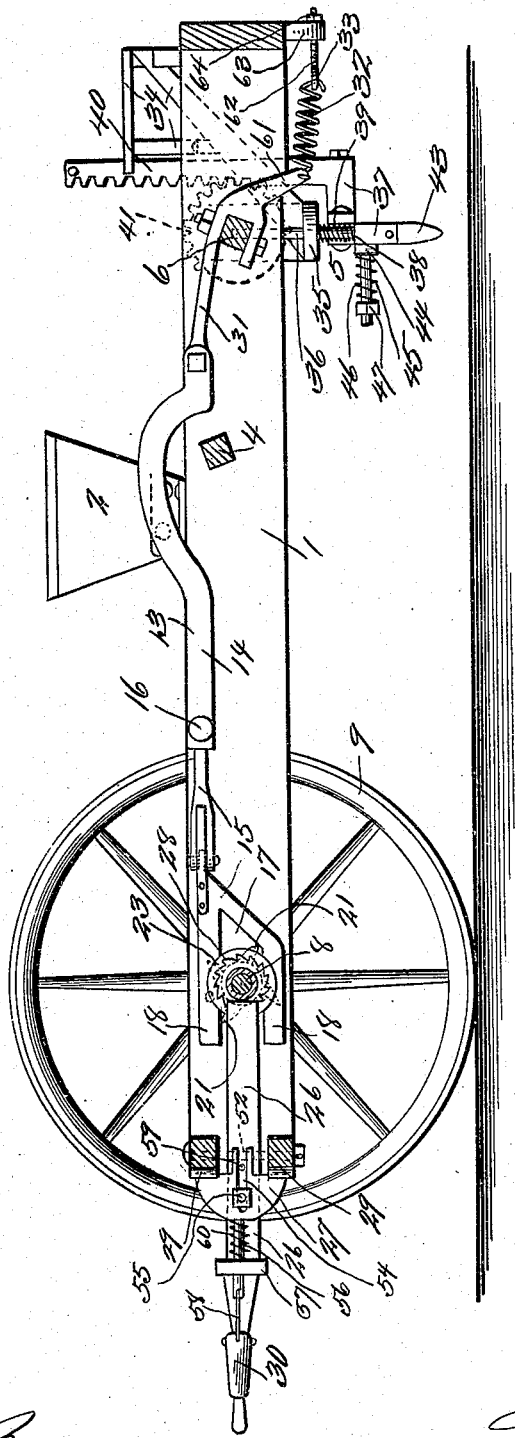

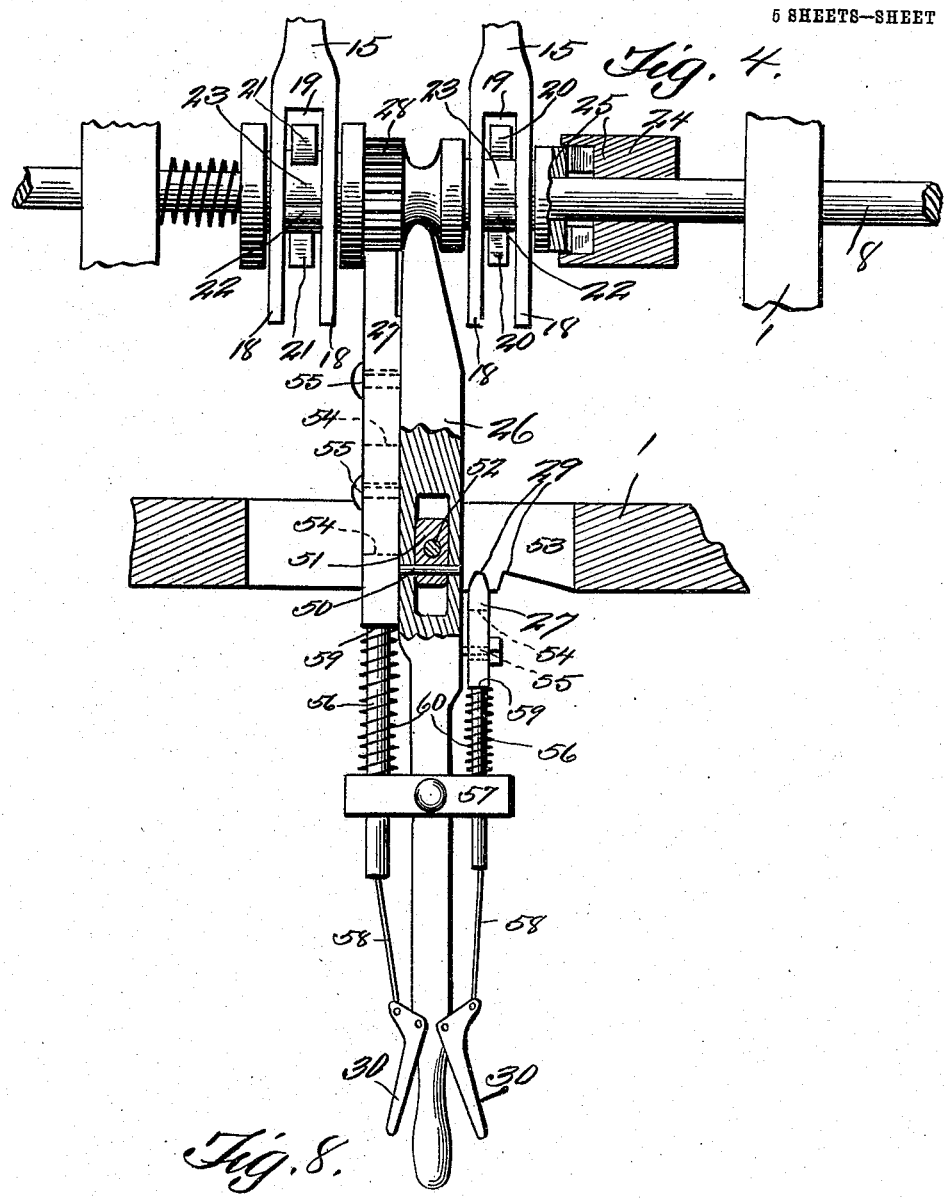

J. RAYNOR & C. FOSTER.
CHECK ROW PLANTER AND MARKER.
APPLICATION FILED SEPT. 9, 1908.
937,176.
Patented Oct. 19, 1909.
5 SHEETS—SHEET 5.
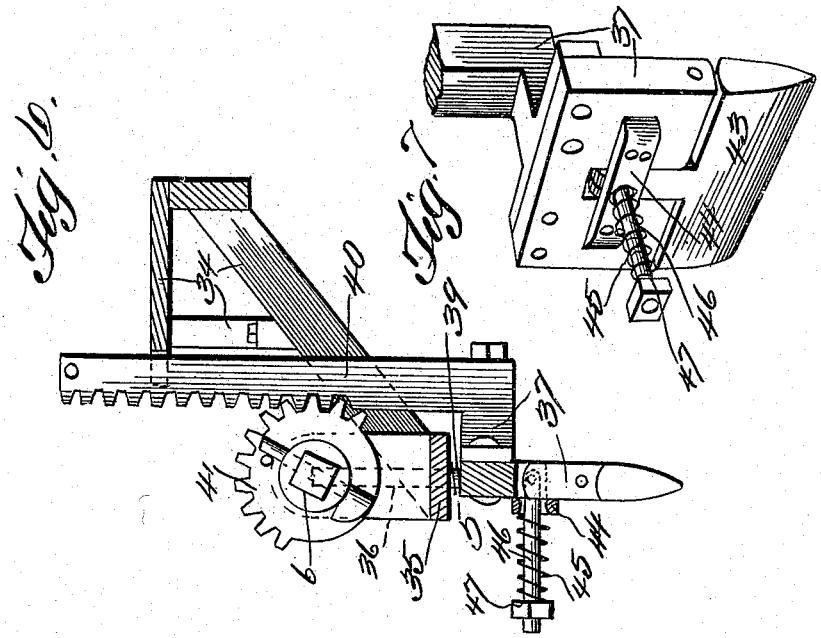

UNITED STATES PATENT OFFICE.

JOHN RAYNOR, OF SOUTH WEST CITY, MISSOURI, AND CHARLEY FOSTER, OF GRAVETTE, ARKANSAS, ASSIGNORS OF ONE-THIRD TO GEORGE D. CATES, OF SOUTH WEST CITY, MISSOURI.

CHECK-ROW PLANTER AND MARKER.

937,176.              Specification of Letters Patent.     Patented Oct. 19, 1909.

Application filed September 9, 1908. Serial No. 452,278.

*To all whom it may concern:*

Be it known that we, JOHN RAYNOR, residing at South West City, McDonald county, State of Missouri, and CHARLEY FOSTER, residing at Gravette, Benton county, State of Arkansas, citizens of the United States, have invented a new and useful Check - Row Planter and Marker; and we do hereby declare the following to be a full, clear, and exact description of the invention, such as will enable others skilled in the art to which it appertains to make and use the same.

The invention about to be set forth and claimed pertains to a new and useful check row corn planter and marker, and the invention in its fundamental characteristics directs as its primary object to provide a device of this nature by which seed may be uniformly and equally distributed throughout a field, and at the same time the locations for planting the grain are marked equal distances apart, as will be clearly manifest.

The invention provides as a further object means whereby the planter is thrown in and out of gear with the traction wheels, that is to say, the planter is thrown out of gear when the device is forced rearward.

A further object of the invention is to provide means whereby the dropping mechanism and marking mechanism are thrown simultaneously in and out of gear, with the driving shaft of the apparatus.

The invention also provides means whereby the dropping mechanism may be operated very quickly, so as to drop the grain at any desired location, which locations may be any distance apart, for instance, the grain to be dropped may be deposited from ten inches to a foot and a half apart, or six to eight inches apart. To accomplish this feat, the dropping mechanism is operated quickly and intermittently by means of a lever, as will be clearly apparent from the drawings.

This invention comprises further objects and combinations of elements, which will be hereinafter more fully described, shown in the accompanying drawings, and the novel features thereof will be pointed out by the appended claims.

The features, elements and the arrangement thereof, which constitute the above entitled invention, may be changed and varied, that is to say, in an actual reduction to practice with the understanding that the changes and variations accruing from said reduction to practice are limited to the scope of the appended claims.

To obtain a full and correct understanding of the details of construction, combinations of features, elements and advantages, reference is to be had to the hereinafter set forth description and the accompanying drawings in connection therewith, wherein—

Figure 1 is a top plan view of the check row corn planter and marker, clearly illustrating the various novel parts of construction. Fig. 2 is a sectional view on line 2—2 of Fig. 1, showing the means for operating the marking devices and the slides of the grain boxes or receptacles. Fig. 3 is a sectional view taken upon the same line upon which Fig. 2 is taken, only looking in the opposite direction. Fig. 4 is an enlarged plan view of the means for operating the marking devices and the slides of the grain receptacles, showing certain features of this portion of the invention partly in section. Fig. 5 is an enlarged side elevation of one of the markers and its frame. Fig. 6 is a vertical sectional view through one of the markers and its frame. Fig. 7 is a detail perspective view of one of the movable members of one of the markers, clearly illustrating its yieldable lower end. Fig. 8 is a detail view of the clutch members, for coöperating with the means for intermittently operating the markers and the slides of the grain receptacles.

In regard to the drawings, wherein similar reference characters indicate corresponding parts in the several illustrations, 1 designates the frame of the apparatus upon which seed or grain boxes 2 are provided, which seed or grain boxes are provided with suitable slides 3, which are operated by the operating shaft 4 for releasing the grain or seed in the boxes, as seen clearly in the drawings. Disposed forward of the seed or grain boxes or receptacles are the markers and their frames 5, which markers are operated by the shaft 6, as will be hereinafter set forth. A detailed description of the construction of the markers will be hereinafter given.

8 designates the axle or power shaft of the corn planter, which is provided with the usual traction wheels 9 which are loosely journaled upon said shaft, and which also as the device is drawn forward are rotatable with said shaft through the medium of the clutch gears 10, as shown clearly in Fig. 1 of the drawings. Either one of the traction wheels is capable of revolving the axle or power shaft, so as to transmit motion to the various parts of the device. The clutch gears 10 are so arranged correlative to the traction wheels, that in case one or the other of the wheels comes in contact with an object which would impede its movement, the other traction wheel would carry on its work with perfect accuracy. Springs 11 surround the axle or power shaft 8, and are designed to coöperate with one of the members of each clutch gear 10 and the side beams of the frame, for holding the members of the clutch gears in operative position.

The shafts 4 and 6 are designed to have intermittent motion, which is obtained through the medium of the members 12 and 13, which coöperate with the axle or shaft 8. These members comprise two parts 14 and 15, the parts 15 being telescopically received by the parts 14, and are held in position by means of screws 16, as seen clearly in Fig. 1 of the drawings. The parts 15 are similarly constructed, that is to say, they are bifurcated, as at 17, and the arms 18 formed by said bifurcations are each bifurcated, as at 19, so as to allow the projections 20 and 21, to extend thereinto, as the axle or shaft is rotated. The bifurcations 19 of the upper arms 18 are provided with frictional members or rollers 22 designed for contact with the said projections, as the said shaft 8 is rotated, as will be clearly understood from the drawings. The projections 20 and 21 are carried by the members 23 and 24 of the clutch gears 25, which are thrown into and out of engagement by means of the lever 26, as seen clearly in Figs. 1 and 2 of the drawings. This lever is provided with a pair of spring actuated dogs 27, one of which engages ratchets 28 of one of the clutch members of the clutch gears 25, for the purpose of imparting a quick intermittent motion to the said clutch member 23, which motion is transmitted to the shafts 4 and 6, so that grain may be dropped when desired and the locations at which the grain is to be deposited are also indicated, while the other dog 27 is designed for engagement with notches 29 of the frame of the apparatus, so as to prevent lateral movement of said lever. Lateral movement of the lever is permitted for the purpose of allowing the clutch member 23 of the clutch gear 25 to be accurately operated. When desired this latter dog may be disengaged from one of the notches 29, by operating one of the hand grips 30 of the said lever, thus allowing the lever to be moved laterally for the purpose of throwing the clutch member 23 out of gear with its coöperating clutch member, and when the lever is thrown laterally, the same may be held so by allowing the latter dog to engage the other notch, as will be clearly understood from Fig. 4 of the drawings. The other dog may also be disengaged from the ratchets 28 by operating the other hand grip, but when it is desired to drop grain at any desired location, the lever is given a quick up and down motion, thus imparting a quick intermittent motion to the said clutch member 23, which motion is transmitted to the shafts 4 and 6 through the medium of the members 12 and 13, as will be clearly evident from the drawings.

The lever 26 is pivoted, as at 50, to a block or member 51, which block or member 51 is pivoted by means of a pin 52, within a slot or opening 53 of the frame of the apparatus, as seen clearly in Figs. 1 and 4 of the drawings. These pivots are for the purpose of allowing the lever to have a universal movement, that is to say, when both of the dogs are thrown out of operation. These dogs are provided with slots 54, through which pins 55 extend, which in conjunction with the said slots guide the dogs in their movements. These dogs are provided with reduced spindle portions 56 which are guided by the member 57, as seen clearly in Fig. 4. These reduced spindle portions are connected to the hand grips 30 by means of the rods 58. Surrounding the reduced spindle portions and disposed between shoulders 59, and the said member 57 are springs 60, which coöperate with the dogs for holding them to their work.

The member 13 is connected, as shown in the drawings, to the shaft 6 by means of a link or member 31. After the shaft 6 has been given an intermittent motion, the said shaft and the member 13 is returned to its normal position by means of the spring 32, which is connected to an extension 61 of said link or member 31 and the adjusting device 33, as seen clearly in Figs. 1 and 2. This adjusting device 33 comprises a threaded member 62, which is mounted in a depending extension 63 of the frame, and is adjustable with relation thereto by means of the nut 64, as will be clearly evident.

The markers comprise frames 34 in which the ends of the marker shaft are journaled, as seen clearly in the drawings. These frames 34 are provided with cross pieces 35, the ends of which are apertured for the reception of the rods 36 of the movable members 37 of the markers, as will be clearly seen in the drawings. Surrounding the rods 35 and disposed between said cross pieces and shoulders 38 of the movable members 36 are springs 39, the tendency of which is to force the movable members 36 downwardly, as will be clearly evident. These movable members are provided with vertical racks 40 which are engaged by the gears 41, which are carried by and movable with the marker shaft, as seen clearly in the drawings. When the shaft 6 is given an intermittent movement, the movable members are forced downwardly, so as to cause them to engage the earth, thereby indicating the locations at which the grain is deposited, as will be clearly evident. These movable members are held in perfect alinement by the racks and the gears. The lower ends of the movable members are provided with pivoted portions 43 which are allowed to oscillate in one direction, that is to say, when they strike an obstruction, but limited in movement in an opposite direction by means of a cross piece 44, as seen clearly in the drawings. These pivoted portions after an obstruction is passed are returned to their normal positions by means of the springs 45 which surround rods 46 and are disposed between shoulders 47 of the rods, and the said cross pieces, as seen clearly in the drawings.

When the device is moving in a forward direction, the axle or power shaft 8 is rotated which causes the projections 20 and 21 to operate the members 12 and 13, which impart an intermittent movement to the shafts 4 and 6 simultaneously, thus causing grain to be dropped, and at the same time, locations at which the grain is to be deposited are indicated, as will be clearly observed.

From the foregoing, the essential features, elements and the operation of the device, together with the simplicity thereof, will be clearly apparent.

Having thus described the invention what is claimed as new and useful by the protection of Letters Patent, is:—

1. In a device as set forth, marking devices having downwardly movable members provided with flexible movable end portions, grain receptacles, a grain dropping mechanism, means for simultaneously and intermittently operating the grain dropping mechanism and the movable members, and means for throwing the grain dropping mechanism in and out of gear, said last named means having means for operating the first named means whereby the grain dropping mechanism may be quickened in its operation.

2. In a device as set forth, marking devices having downwardly movable members provided with flexible movable end portions, a marking shaft therefor having gear connections with said movable members, grain receptacles, a grain dropping mechanism, means for simultaneously intermittently operating the grain dropping mechanism and the marker, and a lever for coöperating with said means whereby the dropping mechanism is thrown out of commission and whereby the motion of said means is quickened so as to simultaneously facilitate the operation of the dropping mechanism and marker.

3. In a device as set forth, marking devices comprising racks having lower end portions, said lower end portions having spring returned pivoted members, means for adjusting the tension of the springs of said pivoted members, frames carried by the said device in which said racks are guided, gears and a marker shaft for operating the racks downwardly, said lower end portions having rods guided in said frames, springs surrounding said rods and interposed between said lower end portions and the frames to assist the gears in forcing the racks downwardly, grain receptacles, grain dropping mechanisms, means for simultaneously and intermittently operating the grain dropping mechanisms and the said marker shaft, means for throwing the grain dropping mechanisms in and out of gear, said last named means having means for increasing the operation of the grain dropping mechanisms.

4. In a device as set forth, marking devices comprising racks having lower end portions, said lower end portions having pivoted members provided with pivoted rods, members 47 adjustably secured upon said rods, resilient means surrounding said rods and interposed between said lower end portions and the members 47, frames carried by said device in which said racks are guided, gears and a marker shaft for operating said racks downwardly, said lower end portions having rods guided in said frames, springs surrounding said last-named rod and interposed between said lower end portions and the frames to assist the gears in forcing the racks downward, grain receptacles, grain-dropping mechanisms, means for simultaneously and intermittently operating the grain-dropping mechanisms and the said marker shaft.

5. In a device as set forth, marking devices comprising racks having lower end portions, said lower end portions having pivoted members provided with pivoted rods, nuts threaded upon said rods, resilient means surrounding said rods and interposed between said lower end portions and the said nuts, frames carried by said device in which said racks are guided, gears and a marker shaft for operating said racks downwardly, said lower end portions having rods guided in said frames, springs surrounding said last-named rod and interposed between said lower end portions and the frames to assist the gears in forcing the racks downward, grain receptacles, grain-dropping mechanisms, means for simultaneously and intermittently operating the grain-dropping mechanisms and the said marker shaft, and means for throwing the grain-dropping mechanisms in and out of gear.

In testimony whereof we have signed our names to this specification in the presence of two subscribing witnesses.

JOHN RAYNOR.
CHARLEY FOSTER.

Witnesses:
J. D. YEARGAIN,
S. A. ROBINSON.